US011259065B2

(12) United States Patent
Beals et al.

(10) Patent No.: US 11,259,065 B2
(45) Date of Patent: *Feb. 22, 2022

(54) SECURELY PAIRED DELIVERY OF ACTIVATION CODES BETWEEN REMOVABLE AND INTEGRATED SECURITY PROCESSORS (71) Applicant: DISH Technologies L.L.C., Englewood, CO (US)

(72) Inventors: William Michael Beals, Englewood, CO (US); John Hamrick, Englewood, CO (US)

(73) Assignee: DISH TECHNOLOGIES L.L.C., Englewood, CO (US)

(*) Notice: Subject to any disclaimer, the term of this patent is extended or adjusted under 35 U.S.C. 154(b) by 87 days.

This patent is subject to a terminal disclaimer.

(21) Appl. No.: 16/659,684

(22) Filed: Oct. 22, 2019

(65) Prior Publication Data
US 2020/0053433 A1 Feb. 13, 2020

Related U.S. Application Data (63) Continuation of application No. 15/474,903, filed on Mar. 30, 2017, now Pat. No. 10,484,752.
(Continued)

(51) Int. Cl.
*H04N 21/418* (2011.01)
*H04L 9/32* (2006.01)
(Continued)

(52) U.S. Cl.
CPC ....... *H04N 21/4181* (2013.01); *H04L 9/3234* (2013.01); *H04L 9/3236* (2013.01);
(Continued)

(58) Field of Classification Search
CPC .......... H04N 21/4181; H04N 21/8453; H04N 21/44236; H04N 21/6547; H04N 21/6334;
(Continued)

(56) References Cited

U.S. PATENT DOCUMENTS

| 5,768,539 | A | 6/1998 | Metz et al. |
| 6,219,787 | B1 | 4/2001 | Brewer |

(Continued)

FOREIGN PATENT DOCUMENTS

| EP | 1688834 | 8/2006 |
| EP | 2299692 | 3/2011 |
| WO | 2007146763 | 12/2007 |

OTHER PUBLICATIONS

Examination Report for EP Application No. 17835539.2 dated Aug. 4, 2020, all pages.
(Continued)

*Primary Examiner* — Dereena T Cattungal
(74) *Attorney, Agent, or Firm* — Kilpatrick Townsend & Stockton LLP (57) ABSTRACT Described herein are systems and methods for hardware enforcement of hardware functionality in a television receiver. An activation message containing an activation code for a specific hardware component within the television receiver can be transmitted from a television service provider system to a television receiver having an associated smart card. The smart card can decrypt the activation message, security check the activation message, confirm the activation message is intended for the television receiver, encrypt the activation message with a local key, and transmit the activation message to a security processor on the television receiver. The security processor can decrypt the activation message, security check the activation message to ensure it is from the smart card and has not been tampered
(Continued)

with, and enable the hardware component within the television receiver based on the activation code within the activation message.

20 Claims, 5 Drawing Sheets

Related U.S. Application Data (60) Provisional application No. 62/438,902, filed on Dec. 23, 2016.

(51) Int. Cl.
| | |
|---|---|
| *H04W 12/06* | (2021.01) |
| *H04N 21/845* | (2011.01) |
| *H04N 21/442* | (2011.01) |
| *H04N 21/6547* | (2011.01) |
| *H04N 21/6334* | (2011.01) |
| *H04N 21/443* | (2011.01) |
| *H04N 21/4367* | (2011.01) |
| *H04L 29/06* | (2006.01) |
| *H04N 21/235* | (2011.01) |
| *H04N 21/435* | (2011.01) |
| *H04N 21/4627* | (2011.01) |
| *H04N 21/6543* | (2011.01) |

(52) U.S. Cl.
CPC ........ *H04L 9/3247* (2013.01); *H04L 63/0464* (2013.01); *H04L 63/0853* (2013.01); *H04L 63/123* (2013.01); *H04N 21/2351* (2013.01); *H04N 21/4353* (2013.01); *H04N 21/4367* (2013.01); *H04N 21/443* (2013.01); *H04N 21/44236* (2013.01); *H04N 21/4627* (2013.01); *H04N 21/6334* (2013.01); *H04N 21/6543* (2013.01); *H04N 21/6547* (2013.01); *H04N 21/8453* (2013.01); *H04W 12/06* (2013.01); *H04L 2209/80* (2013.01)

(58) Field of Classification Search
CPC ............. H04N 21/443; H04N 21/2351; H04N 21/4353; H04N 21/4627; H04W 12/06; H04L 2209/80
USPC ......................................................... 713/172
See application file for complete search history.

(56) References Cited

U.S. PATENT DOCUMENTS

| | | | |
|---|---|---|---|
| 6,651,250 B1 | 11/2003 | Takai | |
| 6,779,198 B1 | 8/2004 | Morinaga et al. | |
| 8,291,238 B2* | 10/2012 | Ginter | G06F 21/10 713/189 |
| 8,385,542 B2 | 2/2013 | Beals et al. | |
| 8,613,081 B2 | 12/2013 | Beals | |
| 8,689,016 B2* | 4/2014 | Morten | H04N 21/8355 713/194 |
| 8,844,816 B2 | 9/2014 | Beals | |
| 9,043,902 B2 | 5/2015 | Beals et al. | |
| 9,100,548 B2 | 8/2015 | Akins, III et al. | |
| 9,270,447 B2 | 2/2016 | Gidwani | |
| 9,270,477 B2* | 2/2016 | Prescott | H04L 43/00 |
| 9,788,209 B2* | 10/2017 | Hauck | H04L 9/3247 |
| 10,171,870 B2 | 1/2019 | Beals | |
| 10,325,077 B2 | 6/2019 | Beals et al. | |
| 10,452,870 B2 | 10/2019 | Beals | |
| 10,484,752 B2 | 11/2019 | Beals et al. | |
| 10,484,753 B2 | 11/2019 | Beals et al. | |
| 2001/0041053 A1* | 11/2001 | Abecassis | H04N 7/17354 386/291 |
| 2002/0099948 A1 | 7/2002 | Kocher et al. | |
| 2003/0030581 A1 | 2/2003 | Roy | |
| 2003/0084440 A1 | 5/2003 | Lownes | |
| 2003/0108199 A1 | 6/2003 | Pinder et al. | |
| 2003/0123400 A1 | 7/2003 | Kloos et al. | |
| 2003/0126400 A1 | 7/2003 | Debiez et al. | |
| 2003/0219127 A1* | 11/2003 | Russ | H04L 12/2805 380/239 |
| 2004/0088552 A1* | 5/2004 | Candelore | H04N 7/1675 713/185 |
| 2005/0084108 A1* | 4/2005 | Durand | H04N 7/163 380/259 |
| 2005/0226170 A1 | 10/2005 | Relan et al. | |
| 2005/0259813 A1* | 11/2005 | Wasilewski | H04N 7/1675 380/28 |
| 2006/0107285 A1 | 5/2006 | Medvinsky | |
| 2006/0161969 A1* | 7/2006 | Moreillon | H04L 63/062 726/3 |
| 2006/0272022 A1 | 11/2006 | Loukianov et al. | |
| 2007/0005506 A1 | 1/2007 | Candelore | |
| 2007/0005986 A1* | 1/2007 | Bernard | H04W 12/065 713/185 |
| 2007/0180464 A1 | 8/2007 | Dellow et al. | |
| 2007/0294178 A1 | 12/2007 | Pinder et al. | |
| 2008/0022299 A1 | 1/2008 | Le Buhan et al. | |
| 2008/0282345 A1* | 11/2008 | Beals | G06F 21/51 726/21 |
| 2009/0014519 A1* | 1/2009 | Singh | G06K 7/0008 235/437 |
| 2009/0019061 A1 | 1/2009 | Scannell, Jr. | |
| 2009/0024827 A1 | 1/2009 | Davis | |
| 2009/0049220 A1 | 2/2009 | Conti et al. | |
| 2009/0125966 A1* | 5/2009 | Cho | H04N 7/1675 725/131 |
| 2009/0157936 A1 | 6/2009 | Goss et al. | |
| 2009/0168996 A1* | 7/2009 | Candelore | H04N 21/4181 380/29 |
| 2009/0172806 A1 | 7/2009 | Natu et al. | |
| 2010/0017840 A1* | 1/2010 | Akins, III | H04N 7/1675 725/131 |
| 2010/0169368 A1 | 7/2010 | Neill | |
| 2011/0010735 A1* | 1/2011 | Newell | H04N 21/42684 725/31 |
| 2011/0017825 A1 | 1/2011 | Beals | |
| 2011/0138164 A1 | 6/2011 | Cha et al. | |
| 2012/0120250 A1 | 5/2012 | Shintani et al. | |
| 2012/0321080 A1 | 12/2012 | Candelore et al. | |
| 2012/0321280 A1 | 12/2012 | Lin | |
| 2013/0070923 A1 | 3/2013 | Kang et al. | |
| 2013/0279694 A1 | 10/2013 | Gremaud et al. | |
| 2014/0282685 A1 | 9/2014 | Beals et al. | |
| 2015/0040155 A1* | 2/2015 | Gutta | H04N 21/4263 725/31 |
| 2016/0050190 A1* | 2/2016 | Mooij | H04N 21/6334 380/279 |
| 2016/0285636 A1* | 9/2016 | Davoust | H04L 9/3242 |
| 2018/0157865 A1 | 6/2018 | Beals | |
| 2018/0184158 A1 | 6/2018 | Beals | |
| 2018/0184159 A1 | 6/2018 | Beals et al. | |
| 2018/0184176 A1 | 6/2018 | Beals et al. | |
| 2018/0184177 A1 | 6/2018 | Beals et al. | |

OTHER PUBLICATIONS

"CI Plus Specification Content Security Extensions to the Common Interface", CI Plus Specification, http://www.ci-plus.com/data/ci-plus_specification_v1.3.pdf, v1.3, Jan. 14, 2011, pp. 1-316.

U.S. Appl. No. 15/370,927, "Advisory Action", dated Apr. 30, 2019, 3 pages.

U.S. Appl. No. 15/370,927, "Final Office Action", dated Feb. 8, 2019, 16 pages.

U.S. Appl. No. 15/370,927, "Non-Final Office Action", dated Jul. 2, 2018, 13 pages.

U.S. Appl. No. 15/370,927, "Notice of Allowance", dated Jun. 18, 2019, 8 pages.

U.S. Appl. No. 15/394,537, "Non-Final Office Action", dated Nov. 28, 2017, 21 pages.

(56) References Cited

OTHER PUBLICATIONS

U.S. Appl. No. 15/394,537, "Notice of Allowance", dated Sep. 11, 2018, 9 pages.
U.S. Appl. No. 15/474,893, "Non-Final Office Action", dated Oct. 29, 2018, 12 pages.
U.S. Appl. No. 15/474,893, "Notice of Allowance", dated Feb. 8, 2019, 9 pages.
U.S. Appl. No. 15/474,903, "Non-Final Office Action", dated Jan. 10, 2019, 25 pages.
U.S. Appl. No. 15/474,903, "Notice of Allowance", dated Jul. 17, 2019, 12 pages.
U.S. Appl. No. 15/474,907, "Non-Final Office Action", dated Jan. 7, 2019, 11 pages.
U.S. Appl. No. 15/474,907, "Notice of Allowance", dated Jul. 17, 2019, 12 pages.
Silberschatz et al., "Operating System Concepts", Fourth Edition, Jan. 1, 1994, pp. 28-35.
PCT/US2017/062756, "International Search Report and Written Opinion", dated Feb. 28, 2018, 12 pages.
PCT/US2017/068173, "International Search Report and Written Opinion", dated Mar. 9, 2018, 11 pages.
PCT/US2017/068150, "International Search Report and Written Opinion", dated Feb. 22, 2018, 14 pages.
PCT/US2017/068163, "International Search Report and Written Opinion", dated Mar. 26, 2018, 11 pages.
PCT/US2017/068167, "International Search Report and Written Opinion", dated Apr. 17, 2018, 13 pages.
PCT/US2017/062756, "International Preliminary Report on Patentability", dated Jun. 20, 2019, 8 pages.
PCT/US2017/068163, "International Preliminary Report on Patentability", dated Jul. 4, 2019, 8 pages.
PCT/US2017/068150, "International Preliminary Report on Patentability", dated Jul. 4, 2019, 8 pages.
PCT/US2017/068167, "International Preliminary Report on Patentability", dated Jul. 4, 2019, 9 pages.
PCT/US2017/068173, "International Preliminary Report on Patentability", dated Jul. 11, 2019, 8 pages.
First Examination Report for EP 17818358.8 dated Mar. 4, 2021, all pages.
"Handbook of Applied Cryptography;, Chapter 1: Overview of Cryptography; Chapter 12: Key Establishment Protocols; Chapter 13: Key Management Techniques ED—Menezes A J: Van Oorschot P C; Vanstone S A", Jan. 1, 1996, Handbook of Applied Cryptography; [CRC Press Series On Discrete Mathematices and Its Applications], CRC Press, Boca Raton, FL, US, pp. 22-23, 510, XP000863989, ISBN: 978-0-8493-8523-0.
Examination Report from the EPO for 17832158.4 dated Oct. 20, 2020, all pages.
Examination Report from the EPO for 17832156.8 dated Oct. 16, 2020, all pages.
Office Action for EP 17832156.8 dated Jul. 9, 2021, all pages.
Examination Report for EP 17835539.2 dated May 12, 2021, all pages.

* cited by examiner

SECURELY PAIRED DELIVERY OF ACTIVATION CODES BETWEEN REMOVABLE AND INTEGRATED SECURITY PROCESSORS

CROSS-REFERENCES TO RELATED APPLICATIONS

This application is a continuation of U.S. Non-Provisional application Ser. No. 15/474,903, entitled SECURELY PAIRED DELIVERY OF ACTIVATION CODES FROM SMART CARD TO HOST SET-TOP BOX, filed Mar. 30, 2017, which claims the benefit of and priority to U.S. Provisional Application No. 62/438,902, entitled SECURITY CENTRAL PROCESSING UNIT STRONG ACTIVATION CODE, filed Dec. 23, 2016, which is incorporated herein by reference in its entirety for all purposes.

This application is related to co-pending U.S. patent application Ser. No. 15/370,927, entitled SMART CARD AUTHENTICATED DOWNLOAD, filed Dec. 6, 2016. This application is further related to co-pending U.S. patent application Ser. No. 15/474,893, entitled STRONG AUTHENTICATION OF CLIENT SET-TOP BOXES, filed concurrently herewith, which claims priority to U.S. Provisional Application No. 62/438,903, filed Dec. 23, 2016. This application is further related to co-pending U.S. patent application Ser. No. 15/474,907, entitled SECURELY PAIRED DELIVERY OF ACTIVATION CODES FROM SMART CARD TO REMOTE CLIENT SET-TOP BOX, filed concurrently herewith, which claims priority to U.S. Provisional Application No. 62/438,908, filed Dec. 23, 2016.

BACKGROUND OF THE INVENTION

Television service providers typically provide services to television service subscribers through a television receiver. The television receiver can include various hardware components that can provide the television service subscriber additional useful functionality associated with their television service. However, not all television service subscribers are willing to pay for additional functionality. Television service providers need a secure way to disable and enable the additional functionality for television service subscribers.

BRIEF SUMMARY OF THE INVENTION

Described herein are systems and methods for hardware enforcement of hardware components in a television receiver. The systems can include a television receiver having a trusted hardware environment that includes a security processor for executing instructions stored on a memory within the trusted hardware environment. The security processor can control the enablement and disablement of hardware components within the television receiver. The systems can also include a smart card, which can be utilized with the television receiver. The smart card can also include a security processor that can execute instructions stored on a memory within the smart card. The instructions stored on the smart card memory and the television receiver trusted hardware memory can perform the associated methods. The methods can include the smart card receiving an activation message that contains an activation code for enabling one or more hardware components of the television receiver. The smart card can decrypt the activation message with a global network key or other unique key, encrypt the activation message with a local key, and transmit the activation message encrypted with the local key to the security processor of the television receiver. The security processor of the television receiver can receive the activation message, decrypt the activation message with the local key, and enable the hardware component based on the activation code.

Optionally, the smart card can receive a second activation message and decrypt the second activation message. Optionally, the smart card can security check the second activation message. Optionally, the smart card can discard the second activation message without transmitting the activation message to the television receiver if the security check of the second activation message failed. Optionally, the smart card can determine whether the activation message is intended for the television receiver.

Optionally, the television receiver can include multiple hardware components. Optionally, the security processor of the television receiver can receive a second activation message and decrypt the second activation message. Optionally, the security processor of the television receiver can security check the second activation message. Optionally, the security processor of the television receiver can disable each of the hardware components if the security check of the second activation message failed.

Optionally, the activation code can be a unique code specific to the hardware component of the television receiver. Optionally, the hardware component can be a wireless network transceiver, a Bluetooth® transceiver, a digital video recorder, a hard drive, or a universal serial bus connector.

Optionally, the security check can include performing an integrity check. The integrity check can include calculating a hash of the activation message using a cryptographic hashing algorithm. The integrity check can further include determining whether the activation message was tampered with based on the hash. Optionally, the security check can include performing a signature check. The signature check can include determining whether the activation message originated from a trusted source based on a signature key. The security check can further include determining that the security check passed only if the activation message was transmitted from a trusted source and that the activation message was not tampered with.

Optionally, the television receiver can include more than one hardware component each having a unique activation code. The method can further include disabling hardware components for which the activation code is not included in the activation message, and enabling hardware components for which the activation code is included in the activation message.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Television service providers often provide television services through a television receiver. The television receiver can include additional hardware functionality for use by the television subscriber. However, not all television service subscribers are willing to pay for the additional hardware functionality. For example, a television receiver can include functionality to allow the television subscriber to utilize a wireless network with connectivity to the Internet (i.e., Wi-Fi capability) throughout the television subscriber's home. However, not all television subscribers wish to pay for wireless network functionality. In such cases, the wireless network transceiver can be disabled via a software command. However, software enforcement of such functionality is susceptible to software hacking such that signal thieves and functionality thieves on a television receiver can re-enable the functionality without much difficulty.

In comparison to software enforcement of such features, hardware enforcement is an order of magnitude more difficult to bypass by the signal and functionality thieves. As described in more detail below, unique activation codes for each piece of hardware/hardware functionality within a television receiver can be secured with hardware enforcement to ensure that the hardware and hardware functionality within a television receiver is only enabled based on valid messages with the proper authorization.

Figure 1:
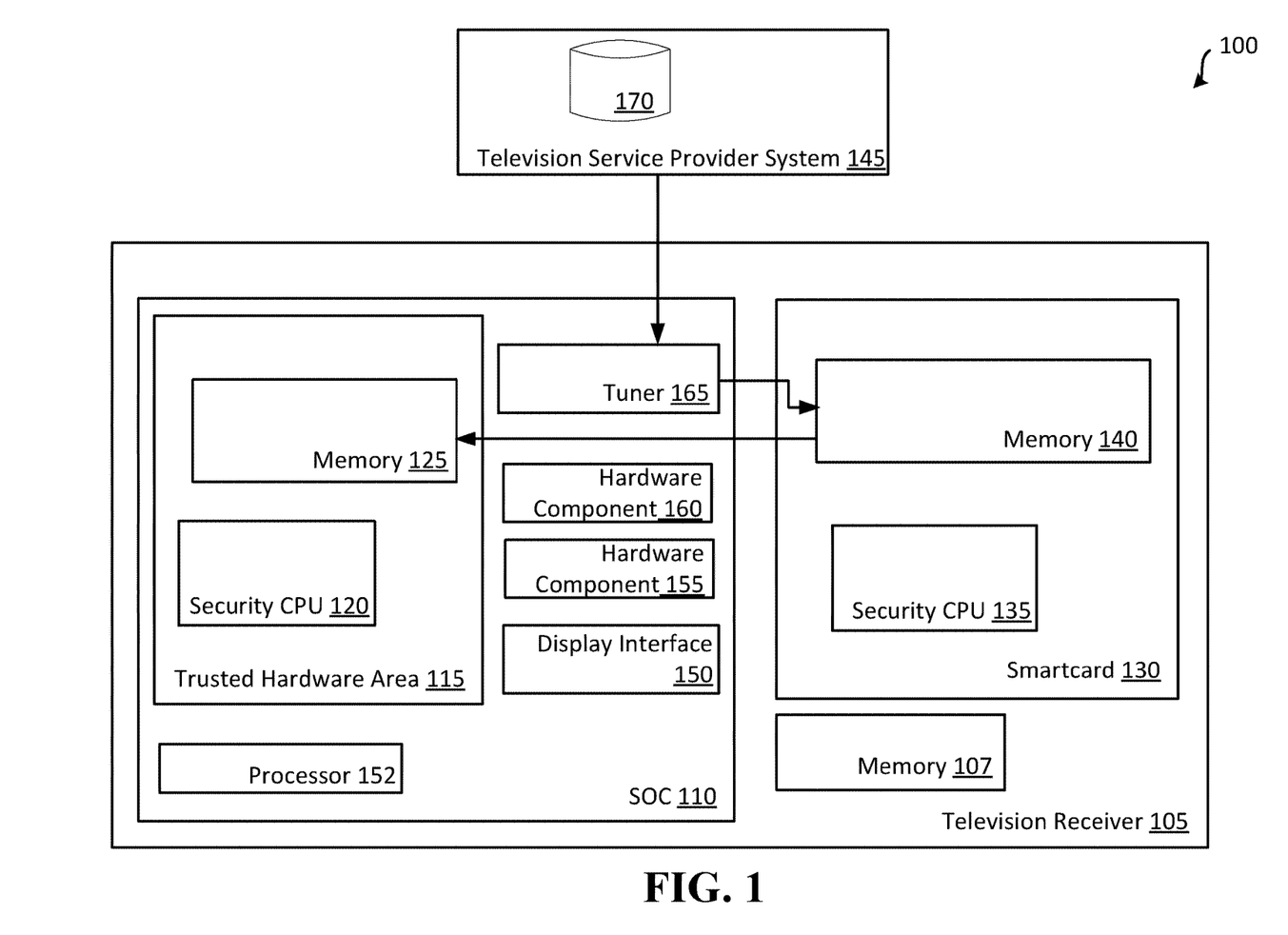
FIG. 1 illustrates an embodiment of a system for providing hardware enforcement of hardware components within a television receiver.

FIG. 1 illustrates an embodiment of a television service system 100. The television service system 100 can include a television service provider system 145 and a television receiver 105. The television receiver 105 can include a system on a chip ("SOC") 110, a memory 107, and a smart card 130. The smart card 130 can include a security central processing unit ("CPU") 135 (also referred to herein as a security processor) and memory 140. The SOC 110 can include display interface 150, processor 152, hardware components 155 and 160, and trusted hardware area 115. Trusted hardware area 115 can include security CPU (also referred to herein as a security processor) 120 and memory 125. Television service provider system 145 can include activation code database 170. Additionally, television receiver 105 can include one or more of the following, which are not shown: a control processor, a tuning management processor, tuner, a network interface, an electronic programming guide ("EPG") database, a digital video recorder ("DVR") database, an on-demand programming database, a home automation settings database, a home automation script database, a remote control interface, and/or a descrambling engine. In other embodiments of television receiver 105, fewer or greater numbers of components may be present. It should be understood that the various components of television receiver 105 may be implemented using hardware, firmware, software, and/or some combination thereof.

Figure 4:
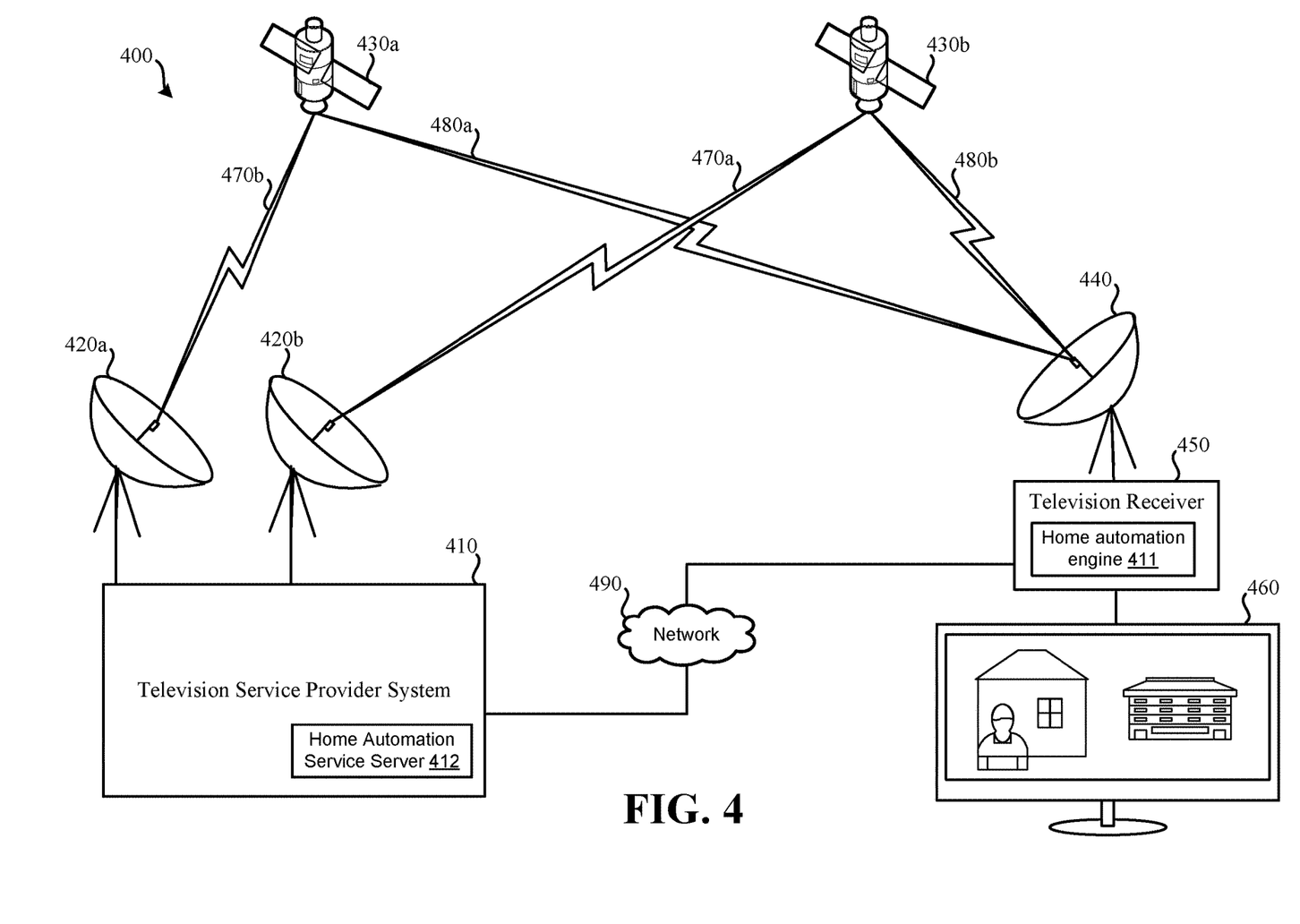
FIG. 4 illustrates an embodiment of a television service provider system.

Television service provider system 145 can be the source of the television service and can be, for example, television service provider system 410 described in FIG. 4. Television service provider system 145 can communicate with television receiver 105, including transmitting content and other data, including software images and activation messages, to television receiver 105. Television service provider system 145 can communicate with television receiver 105 via any suitable network, including satellite as described in FIG. 4. The data transmitted from television service provider system 145 can be transmitted to television receiver 105 and be processed through smart card 130 for decryption and authorization as described in more detail herein.

Television service provider system 145 can include activation code database 170. Activation code database can include an activation code for each hardware component on each television receiver in television service system 100. The activation code for each hardware component can be unique. For example a Wi-Fi network transceiver on a first television receiver (e.g., television receiver 105) can have a different activation code than the activation code of a Wi-Fi network transceiver on a different television receiver (not shown). Each activation code can be a code that authorizes the television receiver 105 to enable the associated hardware component.

Television receiver 105 may be configured to function as a host for a home automation system either alone or in conjunction with a communication device. Television receiver 105 may be in the form of a separate device configured to be connected with a display device, such as a television. Embodiments of television receiver 105 can include a set-top box ("STB"). In addition to being in the form of an STB, a television receiver may be incorporated as part of another device, such as a television, other form of display device, video game console, computer, mobile phone or tablet, or the like. For example, a television may have an integrated television receiver, which does not involve an external STB being coupled with the television.

Television receiver 105 can be, for example, television receiver 450 described in FIG. 4. Television receiver 105 can include a receiving slot into which smart card 130 can be inserted. The receiving slot can include, for example, contact points (not shown) or any other suitable coupling mechanism. Smart card 130 can include contact points (not shown) that line up with the contact points within television receiver 105 such that when smart card 130 is inserted into television receiver 105, a communication link between smart card 130 and television receiver 105 can be created. Any suitable coupling mechanism between smart card 130 and television receiver 105 can be used to create a communication link, such as a male-to-female socket. Optionally smart card 130 can be a removable or a non-removable device within television receiver 105. Optionally, smart card 130 can be, for example, a ball grid array form factor, allowing the smart card 130 to be soldered on the main printed circuit board of the television receiver 105. While only one television receiver 105 is depicted in FIG. 1, any number (tens, hundreds, thousands) of authorized receiving devices can receive broadcasts from television service provider system 145 as part of the television service system 100.

Smart card 130 can be any suitable smart card. Smart card 130 can be provided to the television subscriber by, for example, a television service provider. Smart card 130 can be trusted because smart card 130 is designed to handle only security. As such, memory 140 and security CPU 135 are trusted hardware. Further, if security on smart card 130 is compromised, smart card 130 can be replaced without replacing the entire television receiver 105. Memory 140 can include, for example, instructions that the security CPU 135 can execute to perform various functions specific to smart card 130. For example, memory 140 can include instructions to decrypt data sent from television service provider system 145 using a global network key or other unique key, which can be stored within memory 140.

Memory 140 can also include instructions for encrypting data with a local key. The local key used with television receiver 105 can be a hardware local key. The hardware local key is a static (i.e., does not change) key that is programmed at chip manufacturing for the SOC 110. Optionally, the hardware local key can be programmed at STB manufacturing or some other suitable time. The local key can be known only to the television service provider, the security CPU 120 of the SOC 110, and the smart card 130. Stated differently, the hardware local key for SOC 110 can be known only to trusted hardware including the television service provider trusted hardware, within trusted hardware area 115, and smart card 130. Because the local key is known only to the television service provider, trusted hardware area 115, and the smart card 130, the security CPU 120 can know when it receives data encrypted with the local key that the data was sent from a trusted source. Further, memory 140 can include a unique identifier for smart card 130, which can be used for authorization and pairing smart card 130 to television receiver 105 as described in more detail below. Memory 140 can also include information that specifies the content allowed or intended for television receiver 105. Memory 140 can be any size memory. Memory on a smart card, however, is typically limited due to physical size constraints.

Memory 107 can include instructions for execution by, for example, processor 152. Memory 107 can include the operating system of television receiver 105, for example. Memory 107 can be, for example, working memory 535 of FIG. 5.

SOC 110 can include tuner 165, display interface 150, processor 152, hardware components 155 and 160, and trusted hardware area 115. Trusted hardware area 115 can include memory 125 and security CPU 120. Security CPU 120 can be any suitable processor (i.e., CPU) configured to execute only trusted instructions stored on memory 125. Memory 125 can include, for example, instructions that security CPU 120 can execute to perform various functions specific to television receiver 105. For example, memory 125 can include instructions to decrypt data sent from smart card 130. Memory 125 can also store all activation codes for hardware components 155 and 160 and for security CPU 120. Memory 125 can also store the hardware local key needed to decrypt data intended for television receiver 105. As discussed above, the hardware local key can be programmed into memory 125 during manufacturing of SOC 110. Additionally, SOC 110 can have a unique identifier, which can be stored in memory 125. Memory 125 can be any size memory.

Display interface 150 can serve to output a signal to a television or another form of display device in a proper format for display of video and playback of audio. As such, display interface 150 can output one or more television channels, stored television programming (e.g., television programs from a DVR database or television programs from on-demand programming and/or information from an EPG database), to a television for presentation. SOC 110 can further include other components not shown and described above to control home automation, DVR functionality, and the like.

Processor 152 can be any suitable processor used to process instructions stored in, for example, memory 107. Processor 152 can be one or more general-purpose processors and/or one or more special-purpose processors such as digital signal processing chips, graphics acceleration processors, and/or the like. Processor 152 can be, for example, processor 510 of FIG. 5.

Tuner 165 may include one or more tuners used to tune to transponders that include broadcasts of one or more television channels or transmission of other data, such as software images. Such tuners may be used also to receive for storage on-demand content and/or addressable television commercials. In some embodiments, two, three, or more than three tuners may be present, such as four, six, or eight tuners. Each tuner contained in tuner 165 may be capable of receiving and processing a single transponder stream from a satellite transponder or from a cable network at a given time. As such, a single tuner may tune to a single transponder stream at a given time. If tuner 165 includes multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuner 165 may be used to receive the signal containing the multiple television channels for presentation and/or recording. Tuner 165 may receive commands from a tuning management processor (not shown), which can instruct tuner 165 to which frequencies are to be tuned.

Television receiver 105 can include hardware components 155 and 160. While only two hardware components 155 and 160 are depicted in FIG. 1, any number (more or less) of hardware components 155 and 160 can be present in television receiver 105. Hardware components 155 and 160 can be any type of hardware component for use in television receiver 105. Example hardware components include a digital video recorder ("DVR"), a universal serial bus ("USB") connector, a hard drive, and external hard drive, a wireless network transceiver, a Bluetooth® transceiver, an external USB connector, a decryption component for decrypting local content, and the like. The activation codes for hardware components 155 and 160 can be stored in memory 125 in trusted hardware area 115. Additionally, security CPU 120 can have an activation code, which can also be stored in memory 125. By maintaining the activation codes in the trusted hardware area, they are not easily accessible to signal and functionality thieves.

Data transmitted to television receiver 105 from television service provider system 145 can be encrypted with a global network key or other unique key. This global network or unique key system can prevent signal thieves from stealing content and other data provided to television receiver 105. For signature verification purposes, the smart card 130 within television receiver 105 on the television service system 100 can know the public signature key to verify signatures of the received data, but does not have the private signature key, so not even a compromised smart card can sign data for other devices since it does not have the private signature key. As described in more detail herein, a local key can be used by the authorized decrypting devices (e.g., smart card 130) to maintain a high level of security with the television receivers (e.g., television receiver 105), ensuring that the content and other data transmitted to television receivers remains secure and can only be decrypted by the specific television receiver (e.g., television receiver 105) to which it was transmitted. It is impractical, however, to encrypt each transmission separately for each television receiver and, therefore, a global network key or other unique key is necessary at the television service provider transmission level.

In use, the SOC 110 unique identifier and the smart card 130 unique identifier can be used to pair (also called marrying) the television receiver 105 to smart card 130. When a television subscriber receives a television receiver 105 and smart card 130, the television subscriber can put the smart card 130 into the television receiver 105 and power up the television receiver 105. Once powered on, the television receiver can transmit the unique identifiers of the smart card 130 and the SOC 110 to the television service provider system 145 with a request for authentication. In response, the television service provider system 145 can provide an authentication message. The authentication message can include authentication codes and the local key for SOC 110. Once smart card 130 has the SOC 110 local key, smart card 130 can encrypt data specifically for television receiver 105 that cannot be decrypted by any other television receiver.

After initial pairing, an activation message can be sent by television service provider system 145. Television service provider system 145 can send an activation message to television receiver 105 including activation codes for the hardware that is authorized for use by the television subscriber. Television service provider system 145 can obtain activation codes from activation code database 170 for television receiver 105 based on the subscription of the television subscriber. For example, if the television subscriber has paid for the use of hardware component 155 but not hardware component 160, the television service provider system 145 can transmit an activation message that includes an activation code for hardware component 155 but not the activation code for hardware component 160. The activation message can also include an activation code for security CPU 120 itself. That is, security CPU 120 can be dormant after reset and will respond only to an activation code for itself. Only after security CPU 120 is activated by a valid activation code can security CPU 120 perform other security functions including activating hardware components based on activation codes in activation messages.

The activation message can be transmitted by television service provider system 145 and received by tuner 165 in television receiver 105. Before transmitting the activation message to smart card 130, television receiver 105 can store the encrypted message locally in non-secure memory (not shown) to allow activations to occur after every reset without waiting for television service provider system 145 to send the activation message again. Smart card 130 can receive the activation message from television receiver 105. Security processor 135 can also store the activation message in memory 140.

Security processor 135 can decrypt the activation message with a global network key or other unique key stored in memory 140. Optionally, security processor 135 can perform a security check on the activation message including a signature check to confirm that the activation message originated from television service provider system 145 and including an integrity check to confirm that the activation message has not been tampered with. Additionally, security processor 135 can inspect the data in the activation message to confirm that the activation message is intended for television receiver 105. For example, the activation message can include a unique identifier (e.g., a serial number) of the television receiver. The smart card can know the unique identifier for the television receiver and therefore know that the activation message is intended for the television receiver. If the security check passes, the security processor 135 can encrypt the activation message with the local key for television receiver 105. The security processor 135 can then transmit the activation message encrypted with the local key to the security processor 120.

Security processor 120 can receive the activation message. Until security processor 120 receives the activation message, security processor 120 can be dormant. Upon receiving the activation message, security processor 120 can wake up to confirm activation of itself and any other features on television receiver 105. After receiving the activation message, security processor 120 can store the activation message in memory 125. Security processor 120 can decrypt the activation message with the local key and perform a security check on the activation message. The security check can include a signature check to confirm that the activation message was transmitted from security processor 135. The security check can also include an integrity check to confirm that the activation message is not corrupt and has not been tampered with. If the security check passes, the security processor 120 can identify the activation codes within the activation message. Optionally, the activation message including the activation code for security processor 120 can be a separate message from the activation message that includes activation codes for other hardware functionality. Optionally, each activation code can be transmitted to television receiver 105 in a separate activation message. If the proper activation code for activating security processor 120 is included or if security processor 120 was previously activated, security processor 120 can identify the other hardware functionality activation codes within the activation message and enable the appropriate hardware functionality based on the activation code. For example, if the activation code is associated with hardware component 155, the security processor 120 can enable hardware component 155. If the proper activation code for activating security processor 120 is not included and the security processor 120 was not previously activated, security processor 120 can return to a dormant state after disabling all hardware functionality in television receiver 105. This response can ensure that television receiver 105 is non-functional without the proper activation. Also, because the activation codes are stored only in trusted hardware area 115, at the television service provider, and on the trusted hardware of the smart card 130, the enforcement is very secure. Accessing or changing data stored in trusted hardware areas on smart card 130 and trusted hardware area 115 is very difficult, making it an order of magnitude more difficult to signal and functionality thieves to use the hardware functionality on television receiver 105 without the proper activation.

Note that while the activation message transmitted from security CPU 135 to security CPU 120 may go through areas of television receiver 105 that are not as trusted as smart card 130 and trusted hardware area 115, the security of the activation message is ensured because security CPU 120 will discard messages that have been tampered with. Security CPU 120 is designed to recognize when messages have been tampered with. Therefore, the integrity of the activation message that security CPU 120 utilizes to enable hardware functionality within television receiver 105 is ensured. Further, the activation message includes activation codes as described above. Security CPU 120 can compare the activation codes stored in memory 125 with the activation codes transmitted in the activation message to determine which hardware functionality to enable. Because security CPU 120 is within trusted hardware area 115, the enforcement of the security of the transmitted data is ensured by the trusted hardware. Because hardware enforcement of security is an order of magnitude more secure than software enforcement of security, the system is substantially less vulnerable to hacking than a system in which security were enforced with software and processors that are not in a trusted hardware portion of the television receiver 105.

Figure 2:
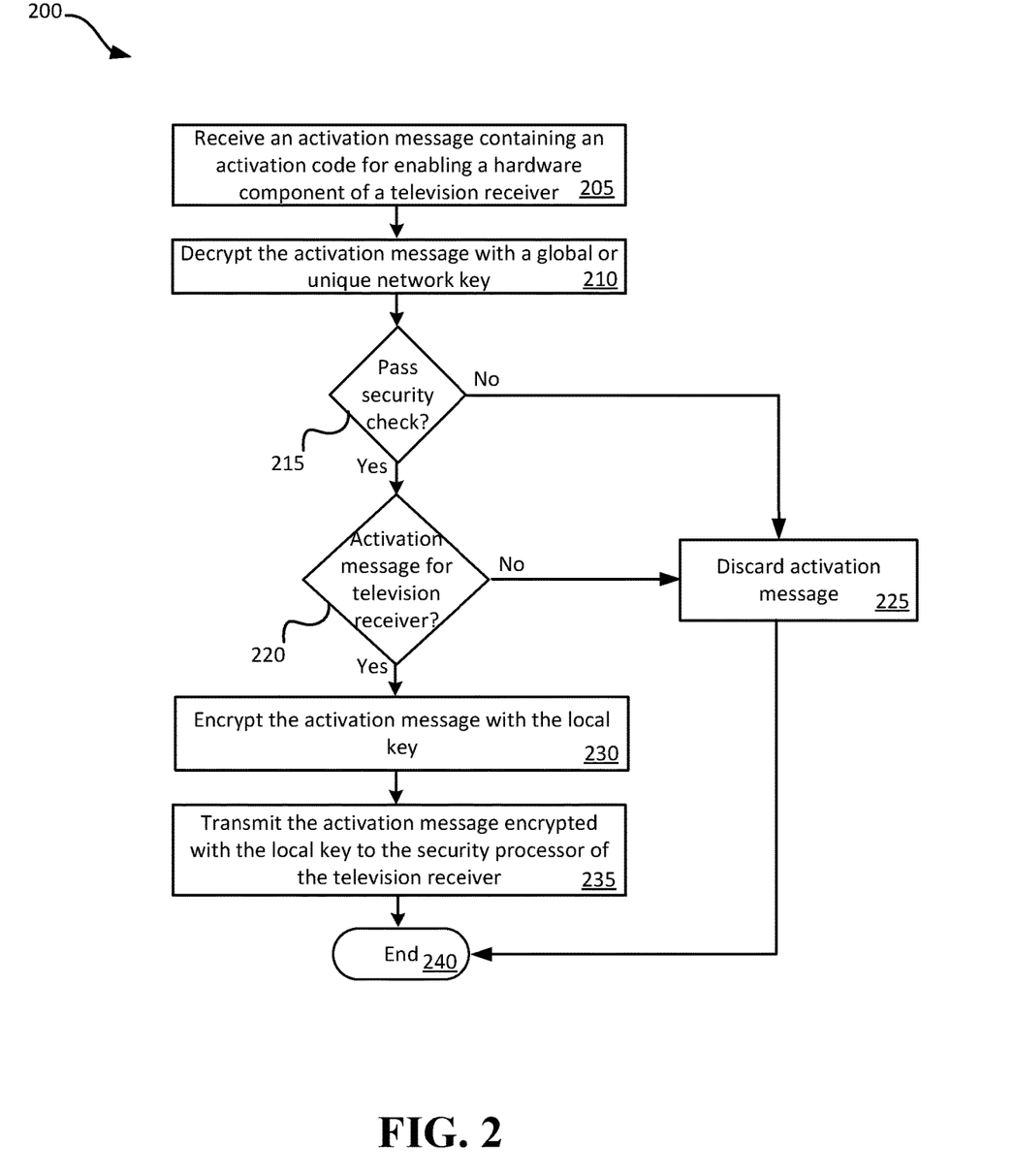
FIG. 2 illustrates a method for providing hardware enforcement of hardware components within a television receiver.

FIG. 2 illustrates a method 200 for providing hardware enforcement of hardware components within a television receiver. Method 200 can be performed, for example, by smart card 130 of FIG. 1. Method 200 can begin at 205 with the smart card receiving an activation message containing an activation code for enabling a hardware component or hardware functionality of a television receiver. The smart card can be inserted into a television receiver for providing security services on the television receiver for a television service provider system. The smart card can receive data via the television receiver from the television service provider system. The data can be sent from the television service provider system via a satellite, cable, or any other suitable network. The data can include activation messages, content, software images, and any other suitable data. The television receiver can include multiple hardware components, each having an associated activation code. The activation code for each hardware component can be unique. Further, the activation code for each hardware component can be unique throughout the entire system. Stated differently, each hardware component on each television receiver can have an associated activation code that is unique from every other hardware component on every other television receiver.

At 210, the smart card can decrypt the activation message with a global network key or a unique key. The global network key can be a key known by each authorized receiving device (e.g., the smart card in each authorized television receiver). Optionally, a unique key can be used that is known to one or more authorized receiving devices.

At 215, the smart card can perform a security check of the activation message. Optionally, the security check can include a signature check. The signature check can confirm that the activation message was received from a trusted source, such as the television service provider system. Only trusted sources have the private signature key needed to sign messages that can be signature checked with the public signature key. The smart card can confirm the source of the activation message is trusted if the signature check with the public signature key was successful. If the signature check passed, the smart card can optionally continue the security check with an integrity check discussed below. If the signature check failed, the smart card can discard the activation message at 225 and the method 200 can end at 240. Note that the order of the integrity check and the signature check can be inverted. Stated differently, the integrity check can be optionally performed before the signature check. Further note that the signature check and the integrity check can each be optional. Optionally, only a signature check is performed. Optionally, only an integrity check is performed. Optionally, some other form of security check can be performed. Optionally, no security check is performed.

Optionally, the smart card can perform an integrity check by calculating a hash of the activation message using a cryptographic hashing algorithm. The cryptographic hashing algorithm can be any suitable hashing algorithm used for confirming that the activation message has not been corrupted or tampered with.

The integrity check can be, for example, a check of the hash against a known value, for example against a hash that is passed with the activation message to the smart card. For example, the first bits transmitted to the smart card from the satellite can be a value against which the hash can be compared. As another example, the last bits transmitted to the smart card from the satellite can be a value against which the hash can be compared. The bits transmitted for comparison can be the value of the hash calculated by the television service provider system and transmitted for the integrity check. The value can be calculated by the television service provider using the same cryptographic hashing algorithm. If the comparison passes, the integrity check can pass and the method can continue at 220. The integrity check can confirm that the activation message is not corrupt and that the activation message has not been tampered with. If the integrity check fails, the smart card can discard the activation message at 225 and the method 200 can end at 240.

At 220, the smart card can confirm that the activation message is intended for the television receiver. For example, the activation message can include information that specifies the television receiver for which it is intended. The smart card can inspect the activation message and confirm that the activation message is intended for the television receiver. If the activation message is not for the television receiver, the smart card can discard the activation message at 225 and the method 200 can end at 240. If the activation message is intended for the television receiver, the method can continue at 230.

Optionally, the smart card can modify the activation message before encrypting the activation message with the local key at 230. For example, the smart card can reformat the activation message. As another example, the smart card can add information to the activation message. As yet another example, the smart card can remove information from the activation message.

At 230, the smart card can encrypt the activation message with the local key. The local key can be the hardware local key specific to the television receiver. By encrypting the activation message with the local key specific to the television receiver, the smart card ensures that the activation message can only be decrypted by the targeted television receiver.

At 235, the smart card can transmit the activation message encrypted with the local key to the security processor of the television receiver. At 240, the method 200 can end.

Figure 3:
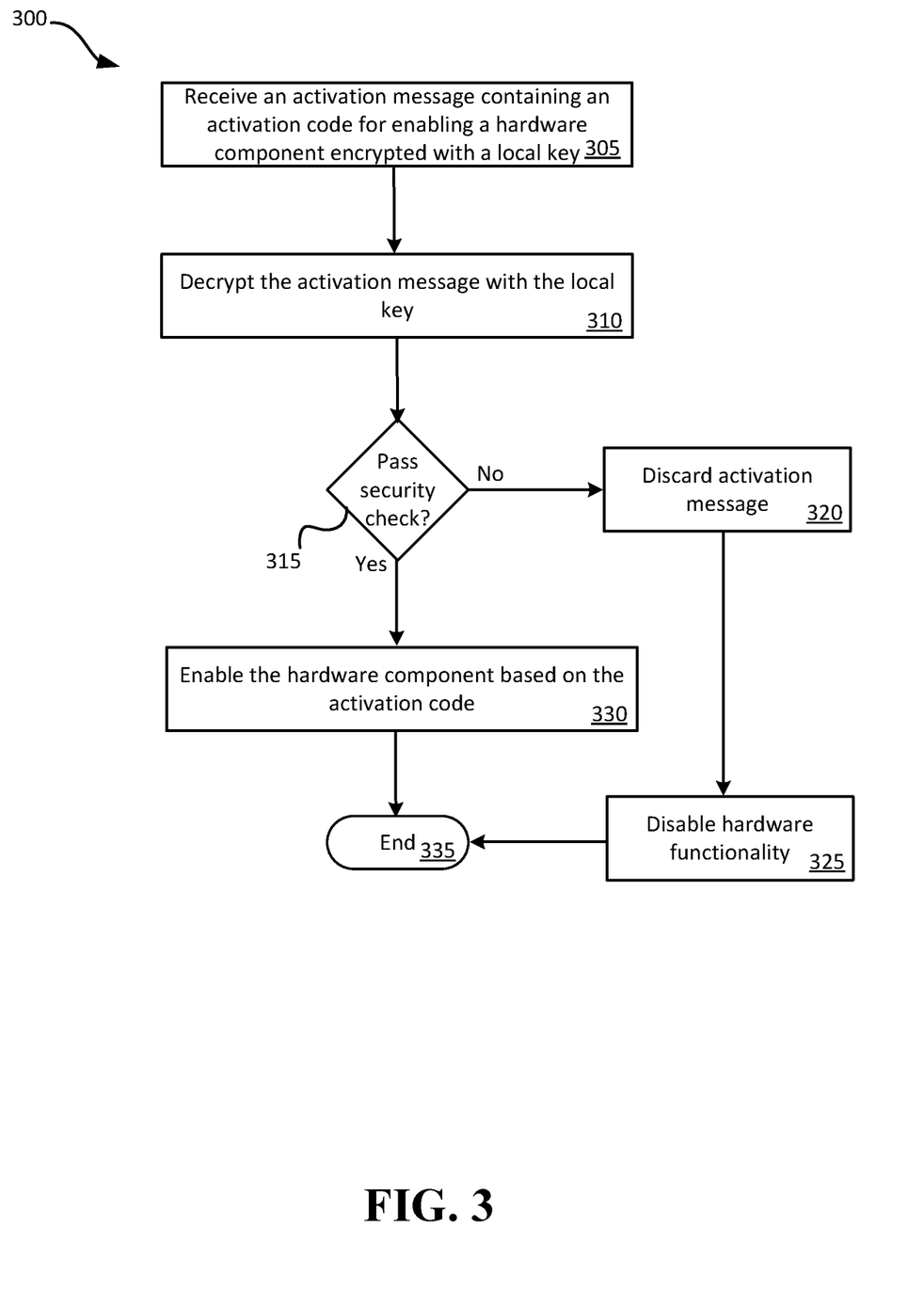
FIG. 3 illustrates another method for providing hardware enforcement of hardware components within a television receiver.

FIG. 3 illustrates a method 300 for providing hardware enforcement of hardware components within a television receiver. Method 300 can be performed by a security processor on a television receiver, such as security processor 120 of FIG. 1. Method 300 can be performed after method 200 of FIG. 2.

Method 300 can begin at 305 with the security processor in the television receiver receiving an activation message containing an activation code for enabling a hardware component within the television receiver. The activation message can be encrypted with a local key, such as the local key discussed at 230 and 235 of FIG. 2.

At 310 the security processor can use the local key specific to the television receiver to decrypt the activation message. The local key can be a hardware local key that is programmed at manufacturing for the SOC on which the security processor resides. Because this local key is static and specific to the television receiver, it can maintain the local key for decryption only trusted sources, such as the smart card paired with the television receiver, can obtain the local key for encryption. The local key can be kept secure in trusted hardware on both the smart card and the television receiver.

If the local key successfully decrypted the activation message, at 315 the security processor can perform a security check of the activation message and determine whether the security check passed. Optionally, the security check can include a signature check. The security processor can check, with a local signature key whether the activation message was transmitted from a trusted source. Only trusted sources have the private local signature key needed to sign messages that can be signature checked with the public signature key The security processor can confirm the source of the activation message is trusted if the signature check with the public signature key was successful. If the signature check passed, the security processor can optionally continue the security check with an integrity check discussed below. If the signature check failed, the security processor can discard the activation message at 320. Upon failure, the security processor can optionally disable all hardware functionality at 325 including that the security processor can return to a dormant state. Disabling the hardware functionality can ensure that signal and functionality thieves are thwarted because without any functionality the television receiver is not very useful. If the hardware is disabled at 325, the method can end at 335. Note that the order of the integrity check and the signature check can be inverted. Stated differently, the integrity check can be optionally performed before the signature check. Further note that the signature check and the integrity check can each be optional. Optionally, only a signature check is performed. Optionally, only an integrity check is performed. Optionally, some other form of security check can be performed. Optionally, no security check is performed.

Optionally, the security processor can perform an integrity check by calculating a hash of the activation message using a cryptographic hashing algorithm. The cryptographic hashing algorithm can be any suitable hashing algorithm used for confirming that the activation message has not been corrupted or tampered with.

The integrity check can be, for example, a check of the hash against a known value, for example against a hash that is passed with the activation message to the security processor. For example, the first bits transmitted to the security processor from the smart card can be a value against which the hash can be compared. As another example, the last bits transmitted to the security processor from the smart card can be a value against which the hash can be compared. The bits transmitted for comparison can be the value of the hash calculated by the television provider and/or the smart card and transmitted for the integrity check. The value can be calculated by the television service provider and/or the smart card using the same cryptographic hashing algorithm as used by the security processor. If the comparison passes, the integrity check can pass. If the integrity check fails, the activation message can optionally be discarded at 320 and the security processor can optionally disable all hardware functionality including that the security processor can return to a dormant state at 325. The method 300 can end at 335.

If the security processor determines that the security check passed, the security processor can enable the hardware component based on the activation code at 330. As part of the activation, there can be an activation code for the security processor itself, which may have been dormant until receiving the activation message. If the activation message includes an activation code for the security processor, then the security processor can proceed with activating hardware functionality based on other activation codes in the activation message. If the activation message does not include an activation code for the security processor, optionally, the security processor can return to a dormant state and disable the hardware functionality of the television receiver. Disabling the security processor and the hardware functionality can make the television receiver generally useless to a signal or functionality thief. If the proper activation code for the security processor is included or the security processor is not otherwise dormant, the security processor can determine which hardware components to enable based on the activation codes included in the activation message. For example, the television receiver can include hardware functionality including a wireless network transceiver, a Bluetooth® transceiver, a DVR, a component for local content decryption, a component for high definition functionality, an external USB, an external hard drive, and an internal hard drive. Each of these components can have a unique activation code.

The activation code can be stored within memory in a trusted hardware area of the television receiver. Upon receipt of the activation codes within the activation message, the security processor can compare the activation codes to those stored within memory to determine which hardware functionality to enable. Once the hardware functionality is enabled at 330, the method can end at 335.

The activation code can be included in the activation message that originated from the television service provider because the activation code can also be stored within an activation code database at the television service provider system (i.e., activation code database 170 of FIG. 1). When the television service provider system generates the activation message to send to the television receiver, the television service provider can include the activation code for each hardware component that the television service subscriber has paid for/subscribed to. When the security processor on the television receiver receives the activation message and identifies the activation codes within the activation message, the security processor can use the activation codes to enable the associated hardware components and disable all other hardware components within the television receiver. So, for example, if the activation message includes an activation code for the wireless network transceiver and the DVR, the security processor can enable the wireless network transceiver and the DVR and disable the Bluetooth® transceiver, the component for high definition functionality, the external USB, and the external hard drive. The local content decryption can, for example, only be disabled when all hardware functionality requiring it is disabled. Further, the internal hard drive can be automatically enabled if, for example, DVR capability is enabled so that the DVR has a location for storing recorded content.

FIG. 4 illustrates an embodiment of a satellite television distribution system 400. While a home automation system may be incorporated with various types of television receivers, various embodiments may be part of a satellite-based television distribution system. Cable, IP-based, wireless, and broadcast focused systems are also possible. Satellite television distribution system 400 may include: television service provider system 410, satellite transmitter equipment 420, satellites 430, satellite dish 440, television receiver 450, home automation service server 412, and display device 460. The display device 460 can be controlled by, for example, a user using a remote control device that can send wired or wireless signals to communicate with the television receiver 450 and/or display device 460. Alternate embodiments of satellite television distribution system 400 may include fewer or greater numbers of components. While only one satellite dish 440, television receiver 450, and display device 460 (collectively referred to as "user equipment") are illustrated, it should be understood that multiple (e.g., tens, thousands, millions of) instances and types of user equipment may receive data and television signals from television service provider system 410 via satellites 430.

Television service provider system 410 and satellite transmitter equipment 420 may be operated by a television service provider. A television service provider may distribute television channels, on-demand programming, programming information, and/or other content/services to users. Television service provider may also distribute software updates for television receiver 450. Television service provider system 410 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 420 may be used to transmit a feed of one or more television channels from television service provider system 410 to one or more satellites 430. While a single television service provider system 410 and satellite transmitter equipment 420 are illustrated as part of satellite television distribution system 400, it should be understood that multiple instances of transmitter equipment may be used, possibly scattered geographically, to communicate with satellites 430. Such multiple instances of satellite transmitting equipment may communicate with the same or with different satellites. Different television channels may be transmitted to satellites 430 from different instances of transmitting equipment. For instance, a different satellite dish of satellite transmitter equipment 420 may be used for communication with satellites in different orbital slots.

Satellites 430 may be configured to receive signals, such as streams of television channels or other data including software images for updating various television receivers, from one or more satellite uplinks such as satellite transmitter equipment 420. Satellites 430 may relay received signals from satellite transmitter equipment 420 (and/or other satellite transmitter equipment) to multiple instances of user equipment via transponder streams. Different frequencies may be used for uplink signals 470 from downlink signals 480. Satellites 430 may be in geosynchronous orbit. Each of the transponder streams transmitted by satellites 430 may contain multiple television channels transmitted as packetized data. For example, a single transponder stream may be a serial digital packet stream containing multiple television channels. Therefore, packets for multiple television channels may be interspersed. Further, information used by television receiver 450 for home automation functions may also be relayed to a television receiver via one or more transponder streams. Further still, software images used to update television receiver 450 can be relayed to television receiver 450 via one or more transponder streams. Additionally, activation messages sent to activate the television receiver 450 and its various functionality can be relayed via one or more transponder streams.

Multiple satellites 430 may be used to relay television channels or any other data such as information used for home automation, activation messages, or software images used to update television receiver 450 from television service provider system 410 to satellite dish 440. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 430a. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 440 may be a piece of user equipment that is used to receive transponder streams from one or more satellites, such as satellites 430. Satellite dish 440 may be provided to a subscriber for use on a subscription basis to receive television channels provided by the television service provider system 410, satellite transmitter equipment 420, and/or satellites 430. Satellite dish 440, which may include one or more low noise blocks ("LNBs"), may be configured to receive transponder streams from multiple satellites and/or multiple transponders of the same satellite. Satellite dish 440 may be configured to receive television channels via transponder streams on multiple frequencies. Based on the characteristics of television receiver 450 and/or satellite dish 440, it may only be possible to capture transponder streams from a limited number of transponders concurrently. For example, a tuner of television receiver 450 may only be able to tune to a single transponder stream from a transponder of a single satellite at a given time. The tuner can then be re-tuned to another transponder of the same or a different satellite. A television receiver 450 having multiple tuners may allow for multiple transponder streams to be received at the same time.

In communication with satellite dish 440 may be one or more television receivers. Television receivers may be configured to decode signals received from satellites 430 via satellite dish 440 for output and presentation via a display device, such as display device 460. A television receiver may be incorporated as part of a television or may be part of a separate device, commonly referred to as a set-top box ("STB"). Television receiver 450 may decode signals received via satellite dish 440 and provide an output to display device 460. On-demand content, such as pay-per-view ("PPV") content, may be stored to a computer-readable storage medium. FIG. 1 provides additional detail of various embodiments of a television receiver. A television receiver is defined to include STBs, and also circuitry having similar functionality that may be incorporated with another device. For instance, circuitry similar to that of a television receiver may be incorporated as part of a television. As such, while FIG. 4 illustrates an embodiment of television receiver 450 as separate from display device 460, it should be understood that, in other embodiments, similar functions may be performed by a television receiver integrated with display device 460. Television receiver 450 may include home automation engine 411.

Display device 460 may be used to present video and/or audio decoded and output by television receiver 450. Television receiver 450 may also output a display of one or more interfaces to display device 460, such as an electronic programming guide ("EPG"). In many embodiments, display device 460 is a television. Display device 460 may also be a monitor, computer, or some other device configured to display video and, possibly, play audio.

Uplink signal 470a represents a signal between satellite transmitter equipment 420 and satellite 430a. Uplink signal 470b represents a signal between satellite transmitter equipment 420 and satellite 430b. Each of uplink signals 470 may contain streams of one or more different television channels. For example, uplink signal 470a may contain a first group of television channels, while uplink signal 470*b* contains a second group of television channels. Each of these television channels may be scrambled or encrypted such that unauthorized persons are prevented from accessing the television channels. Uplink signals 470 can also contain other data as described herein, such as activation messages or software images for updating television receiver 450.

Downlink signal 480*a* represents a signal between satellite 430*a* and satellite dish 440. Downlink signal 480*b* represents a signal between satellite 430*b* and satellite dish 440. Each of downlink signals 480 may contain one or more different television channels, which may be at least partially scrambled. A downlink signal may be in the form of a transponder stream. A single transponder stream may be tuned to at a given time by a tuner of a television receiver. For example, downlink signal 480*a* may be a first transponder stream containing a first group of television channels, while downlink signal 480*b* may be a second transponder stream containing a different group of television channels. In addition to or instead of containing television channels, a transponder stream can be used to transmit on-demand content to television receivers, including PPV content, which may be stored locally by the television receiver until output for presentation. Further, a transponder stream can contain other data as described herein, such as activation messages or software images for updating television receiver 450.

FIG. 4 illustrates downlink signal 480*a* and downlink signal 480*b*, being received by satellite dish 440 and distributed to television receiver 450. For a first group of television channels, satellite dish 440 may receive downlink signal 480*a* and for a second group of channels, downlink signal 480*b* may be received. Television receiver 450 may decode the received transponder streams. As such, depending on which television channels are desired to be presented or stored, various transponder streams from various satellites may be received, descrambled, and decoded by television receiver 450. Further, television receiver 450 can control content as described in more detail in FIG. 1.

Network 490, which may include the Internet, may allow for bidirectional communication between television receiver 450 and television service provider system 410, such as for home automation related services provided by home automation service server 412. Although illustrated as part of the television service provider system, the home automation service server 412 may be provided by a third party in embodiments. In addition or in alternate to network 490, a telephone, e.g., landline, or cellular connection may be used to enable communication between television receiver 450 and television service provider system 410.

Figure 5:
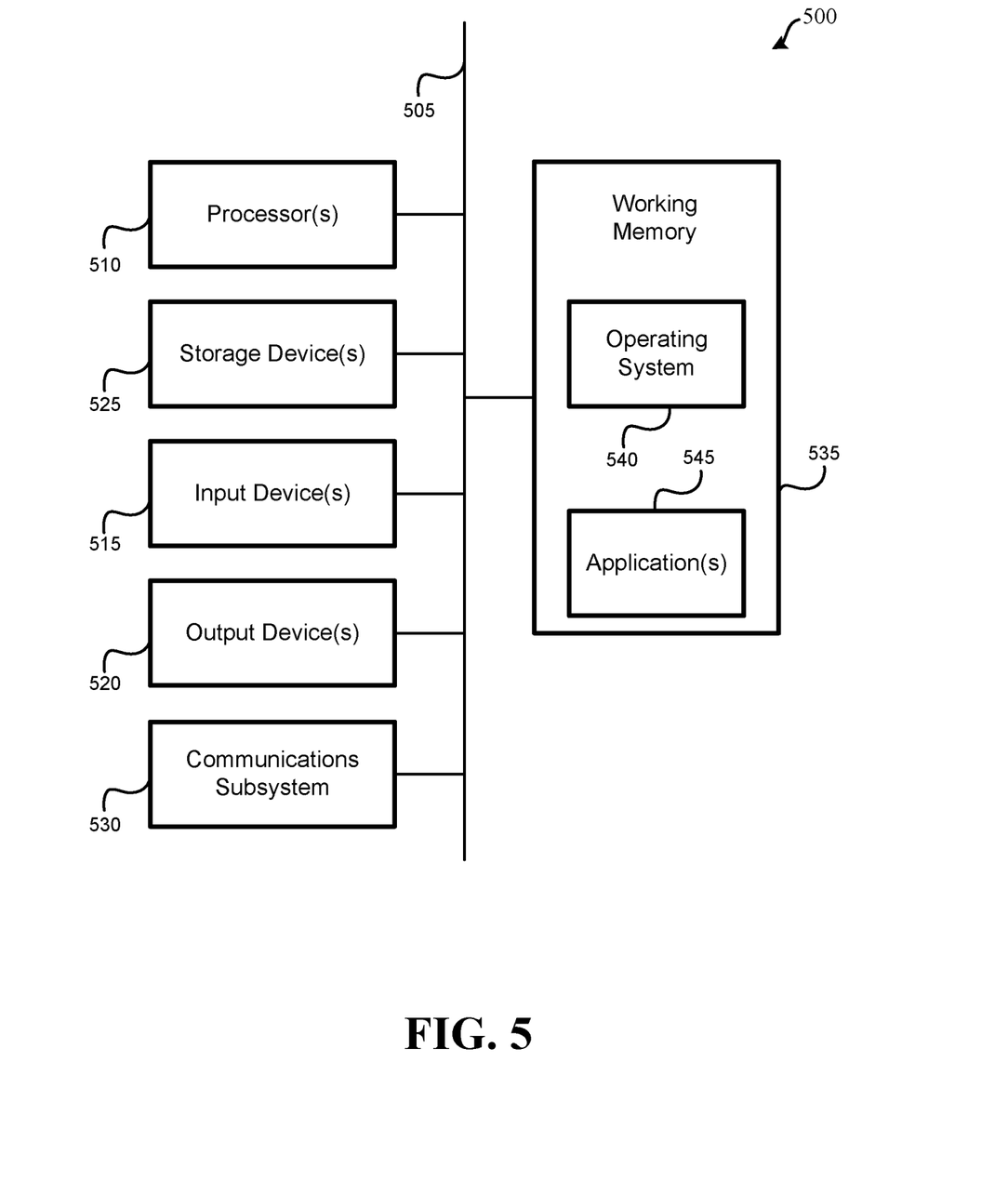
FIG. 5 illustrates an embodiment of a computer system.

FIG. 5 illustrates an embodiment of a computer system 500. A computer system 500 as illustrated in FIG. 5 may be incorporated into devices such as a television receiver (e.g., television receiver 105 of FIG. 1), DVR, television, media system, personal computer, and the like. FIG. 5 provides a schematic illustration of one embodiment of a computer system 500 that can perform some or all of the steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505, or may otherwise be in communication, as appropriate. The hardware elements may include one or more processors 510 (e.g., processor 152 of FIG. 1), including without limitation one or more general-purpose processors and/or one or more special-purpose processors such as digital signal processing chips, graphics acceleration processors, and/or the like; one or more input devices 515, which can include without limitation a mouse, a keyboard, a camera, a remote control, and/or the like; and one or more output devices 520, which can include without limitation a display device, a printer, and/or the like.

The computer system 500 may further include and/or be in communication with one or more non-transitory storage devices 525 (e.g., memory 107 of FIG. 1), which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset such as a Bluetooth™ device, an 802.11 device, a Wi-Fi device, a WiMax device, cellular communication facilities, etc., and/or the like. The communications subsystem 530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 530. In other embodiments, a portable electronic device, may be incorporated into the computer system 500 (e.g., an electronic device or STB), as an input device 515. In many embodiments, the computer system 500 will further comprise a working memory 535, which can include a RAM or ROM device, as described above. Memory 125 of FIG. 1 can include a working memory.

The computer system 500 also can include software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 2 or 3, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 525 described above. In some cases, the storage medium might be incorporated within a computer system, such as computer system 500. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the procedures of such methods are performed by the computer system 500 in response to processor 510 executing one or more sequences of one or more instructions, which might be incorporated into the operating system 540 and/or other code, such as an application program 545, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 and/or components thereof generally will receive signals, and the bus 505 then might carry the signals and/or the data, instructions, etc. carried by the signals to the working memory 535, from which the processor(s) 510 retrieves and executes the instructions. The instructions received by the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method comprising:
   receiving an activation message at a receiver, the receiver having a first security processor that is removably installed in the receiver, a second security processor integrated in a trusted hardware environment of the receiver, and a plurality of hardware components, the second security processor controlling enabling of each of the plurality of hardware components, the activation message containing a hardware activation code for enabling a particular hardware component of the plurality of hardware components of the receiver, the activation message including the hardware activation code being encrypted in accordance with a global network key stored by the first security processor;
   first decrypting the activation message including the hardware activation code by the first security processor in accordance with the global network key to obtain the hardware activation code;
   consequent to the first decrypting of the hardware activation code in accordance with the global network key, encrypting the hardware activation code by the first security processor using a local key to generate an encrypted activation code, the local key unique to the receiver and stored at both the first security processor and the trusted hardware environment;
   transmitting, by the first security processor, the encrypted activation code that is encrypted in accordance with the local key to the second security processor;
   receiving, by the second security processor, the encrypted activation code that is encrypted in accordance with the local key;
   second decrypting the encrypted activation code that is encrypted in accordance with the local key by the second security processor using the local key to obtain the hardware activation code; and
   enabling the particular hardware component by the second security processor based on the hardware activation code.

2. The method of claim 1, wherein:
   the trusted hardware environment of the receiver further has a memory integrated therein, the memory coupled with the second security processor; and
   the local key is stored by the trusted hardware environment by being stored in the memory.

3. The method of claim 1, further comprising:
   security checking, subsequent to the first decrypting, the activation message by the first security processor to determine whether a security check passed or the security check failed; and
   wherein the encrypting and the transmitting are performed only responsive to determining that the security check passed.

4. The method of claim 3, wherein the security checking comprises:
   calculating, by the first security processor, a cryptographic hash of the activation message; and
   determining, by the first security processor, whether the activation message was tampered with based on the cryptographic hash,
   wherein it is determined that the security check failed in response to determining that the activation message was tampered with based on the cryptographic hash, and
   wherein it is determined that the security check failed in response to determining that the activation message was not tampered with based on the cryptographic hash.

5. The method of claim 3, wherein the security checking comprises:
   performing, by the first security processor, a signature check to determine whether the activation message was transmitted by a recognized provider based on a signature key,
   wherein it is determined that the security check failed in response to determining that the activation message was not transmitted by a recognized provider based on the signature key, and
   wherein it is determined that the security check failed in response to determining that the activation message was transmitted by a recognized provider based on the signature key.

6. The method of claim 3, further comprising:
   discarding the activation message in response determining that the security check failed.

7. The method of claim 1, further comprising:
   security checking, subsequent to the second decrypting, the activation message by the second security processor to determine whether a security check passed or the security check failed; and
   wherein the enabling is performed only responsive to determining that the security check passed.

8. The method of claim 7, wherein the security checking comprises:
   calculating, by the second security processor, a cryptographic hash of the hardware activation code; and
   determining, by the second security processor, whether the hardware activation code was tampered with based on the cryptographic hash,
   wherein it is determined that the security check failed in response to determining that the hardware activation code was tampered with based on the cryptographic hash, and
   wherein it is determined that the security check failed in response to determining that the hardware activation code was not tampered with based on the cryptographic hash.

9. The method of claim 7, wherein the security checking comprises:
   performing, by the second security processor, a signature check to determine whether the hardware activation code was transmitted by the first security processor based on a signature key,
   wherein it is determined that the security check failed in response to determining that the hardware activation code was not transmitted by the first security processor based on the signature key, and
   wherein it is determined that the security check failed in response to determining that the hardware activation code was transmitted by the first security processor based on the signature key.

10. The method of claim 7, further comprising:
disabling, by the second security processor, at least some of the plurality of hardware components in response to determining that the security check failed.

11. The method of claim 1, wherein:
the receiving comprises receiving one or more activation messages at the receiver comprising a plurality of hardware activation codes, each of the plurality of hardware activation codes for enabling an associated hardware component of the plurality of hardware components of the receiver;
the first decrypting is to obtain the plurality of hardware activation codes;
the encrypting comprises encrypting the plurality of hardware activation codes by the first security processor using the local key to generate a plurality of encrypted activation codes;
the transmitting comprises transmitting the plurality of encrypted activation codes by the first security processor to the second security processor;
the receiving comprises receiving the plurality of encrypted activation codes by the second security processor;
the second decrypting is to obtain the plurality of hardware activation codes; and
the enabling comprises enabling each of the plurality of hardware components by the second security processor based on an associated hardware activation code of the plurality of hardware activation codes.

12. A receiver system comprising:
a plurality of hardware components;
a trusted hardware environment having a second security processor and a memory integrated therein; and
a hardware port to removably receive a first security processor, configured, when installed in the hardware port, to:
receive an activation message containing a hardware activation code for enabling a particular hardware component of the plurality of hardware components, the activation message including the hardware activation code being encrypted in accordance with a global network key stored by the first security processor;
first decrypt the activation message including the hardware activation code in accordance with the global network key to obtain the hardware activation code;
consequent to the first decrypting of the hardware activation code in accordance with the global network key, encrypt the hardware activation code using a local key to generate an encrypted activation code, the local key unique to the receiver system and stored at both the first security processor and the memory; and
transmit the encrypted activation code that is encrypted in accordance with the local key to the second security processor,
wherein, in response to receiving the encrypted activation code, the second security processor is configured to:
second decrypt the encrypted activation code that is encrypted in accordance with the local key using the local key to obtain the hardware activation code; and
enable the particular hardware component by the second security processor based on the hardware activation code.

13. The receiver system of claim 12, wherein the first security processor is configured further to:
security check the activation message, subsequent to the first decrypting, to determine whether the security check passed or the security check failed; and
wherein the first security processor is configured to encrypt and transmit only responsive to determining that the security check passed.

14. The receiver system of claim 13, wherein the first security processor is configured to security check by:
calculating a cryptographic hash of the activation message; and
determining whether the activation message was tampered with based on the cryptographic hash,
wherein it is determined that the security check failed in response to determining that the activation message was tampered with based on the cryptographic hash, and
wherein it is determined that the security check failed in response to determining that the activation message was not tampered with based on the cryptographic hash.

15. The receiver system of claim 13, wherein the first security processor is configured to security check by:
performing a signature check to determine whether the activation message was transmitted by a recognized provider based on a signature key,
wherein it is determined that the security check failed in response to determining that the activation message was not transmitted by a recognized provider based on the signature key, and
wherein it is determined that the security check failed in response to determining that the activation message was transmitted by a recognized provider based on the signature key.

16. The receiver system of claim 13, wherein the first security processor is configured further to:
discard the activation message in response determining that the security check failed.

17. The receiver system of claim 12, wherein the second security processor is configured further to:
security check, subsequent to the second decrypting, the activation message to determine whether the security check passed or the security check failed; and
wherein the second security processor is configured to enable only responsive to determining that the security check passed.

18. The receiver system of claim 17, wherein the second security processor is configured to security check by:
calculating a cryptographic hash of the hardware activation code; and
determining whether the hardware activation code was tampered with based on the cryptographic hash,
wherein it is determined that the security check failed in response to determining that the hardware activation code was tampered with based on the cryptographic hash, and
wherein it is determined that the security check failed in response to determining that the hardware activation code was not tampered with based on the cryptographic hash.

19. The receiver system of claim 17, wherein the second security processor is configured to security check by:
performing a signature check to determine whether the hardware activation code was transmitted by the first security processor based on a signature key, wherein it is determined that the security check failed in response to determining that the hardware activation code was not transmitted by the first security processor based on the signature key, and wherein it is determined that the security check failed in response to determining that the hardware activation code was transmitted by the first security processor based on the signature key.

20. The receiver system of claim 17, wherein the second security processor is configured further to:

disable at least some of the plurality of hardware components in response to determining that the security check failed.

* * * * *